United States Patent [19]
Kronenberg

[11] Patent Number: 5,120,969
[45] Date of Patent: Jun. 9, 1992

[54] RADIOCHROMIC DOSIMETER

[75] Inventor: Stanley Kronenberg, Skillman, N.J.

[73] Assignee: The United States of America as represented by the Secretary of the Army, Washington, D.C.

[21] Appl. No.: 751,378

[22] Filed: Aug. 26, 1991

[51] Int. Cl.$^5$ .................................. G01T 1/02
[52] U.S. Cl. ...................... 250/474.1; 250/472.1
[58] Field of Search ................ 250/474.1, 472.1

[56] References Cited

U.S. PATENT DOCUMENTS

| | | | |
|---|---|---|---|
| 4,377,751 | 3/1983 | Kronenberg et al. | 250/474.1 |
| 4,489,240 | 12/1984 | Kronenberg et al. | 250/474.1 |
| 4,602,425 | 7/1986 | Kronenberg | 29/600 |
| 4,864,144 | 9/1989 | McLaughlin et al. | 250/472.1 |

OTHER PUBLICATIONS

Kronenberg et al., "Fiber Optics Dosimetry", Nucl. Instrum. and Methods, 179, 1980, pp. 109–111.
Radak et al., "Enhanced Sensitivity of Chemical Dosimeters Using Liquid-Core Optical Waveguides", Nucl. Instrum. & Methods, A243, 1986, pp. 201–206.

Primary Examiner—Carolyn E. Fields
Attorney, Agent, or Firm—Michael Zelenka; William H. Anderson

[57] ABSTRACT

A radiochromic dosimeter for use as a tactical or like dosimeter for measuring absorbed ionizing, radiation dose of relatively high range. This dosimeter includes an outer barrel, a first ultraviolet light opaque, ionizing radiation transparent tube, a liquid solution of leuko dye disposed in the first tube, a second ultraviolet light opaque, ionizing radiation transparent tube, a liquid solvent disposed in the second tube, the tubes having end sealing beads, the outer barrel having end tube supports, a filter disposed next to output ends of the tubes, a lens disposed next to the filter for viewing filtered light circles, and a light adjuster for controlling light amount passing into the second tube input end.

7 Claims, 1 Drawing Sheet

RADIOCHROMIC DOSIMETER

GOVERNMENTAL INTEREST

The invention described herein may be manufactured, used, and licensed by or for the Government for governmental purposes without the payment to me of any royalty thereon.

FIELD OF THE INVENTION

This invention relates in general to an a radiochromic dosimeter, and in particular to a high range radiochromic dosimeter having a first elongate waveguide containing a radiochromic mixture and having a second elongate waveguide parallel thereto and containing a non-radiochromic mixture.

BACKGROUND OF THE INVENTION

The prior art radiochromic dosimeter is described in U.S. Pat. No. 4,377,751, issued Mar. 22, 1983. Related patents include U.S. Pat. No. 4,489,240, issued Dec. 18, 1984, and U.S. Pat. No. 4,602,425, issued Jul. 29, 1986.

The prior art radiochromic dosimeter includes a light transparent tubing filled with a transparent radiochromic liquid having a transparency which changes with the dose of ionizing radiation, the refractive index of the liquid being greater than the refractive index of the transparent tubing, an outer tubing opaque to ultraviolet light over the transparent tubing, the ends of the transparent tubing being enclosed and sealed to retain said liquid, and a clear ultraviolet absorbing coating over the enclosed ends to provide a shield against ambient ultraviolet light.

One problem with the prior art radiochromic dosimeter is that the absorbed dose is determined by comparing the color depth to a calibrated color wedge, so that there is sometimes a problem of obtaining an accurate dose measurement.

SUMMARY OF THE INVENTION

According to the present invention, a radiochromic dosimeter is provided. This dosimeter comprises an outer barrel having an axis, a first elongate inner tube opaque to ultraviolet light and filled with transparent radiochromic liquid having a transparency which changes with the dose of ionizing radiation, a second similar elongate inner tube filled with a transparent non-radiochromic liquid having a transparency which does not change with the dose of ionizing radiation, said outer tube and said first and second inner tubes being radiation transparent, said first and second inner tubes each having opposite end closure portions resistant to ultraviolet light for liquid sealing, said outer barrel having opposite end support members for supporting the first and second inner tubes, said second inner tube having light control means for adjusting the amount of light inputted axially through the liquid therein, said first and second inner tubes having light intensity comparison means for comparing the intensities of the lights passed axially through the respective liquids, and said light control means having dose measuring means for measuring the absorbed ionizing radiation dose.

By using the second inner tube and light control means and light intensity comparison means, the problem of obtaining an accurate dose measurement is avoided.

An object of the present invention is to provide a tactical dosimeter.

Another object is to provide a tactical dosimeter which accurately measures an absorbed ionizing radiation dose for civilian defense use and like uses.

A further object is to provide a relatively inexpensive, high range dosimeter, which does not require a power source or other auxiliary equipment.

A still further object is to provide a pocket size, pencil shaped dosimeter.

BRIEF DESCRIPTION OF THE DRAWINGS

These and other objects, features, and details of the invention will become apparent in light of the ensuing detailed disclosure, and particularly in light of the drawings wherein.

DETAILED DESCRIPTION

Figure 1:
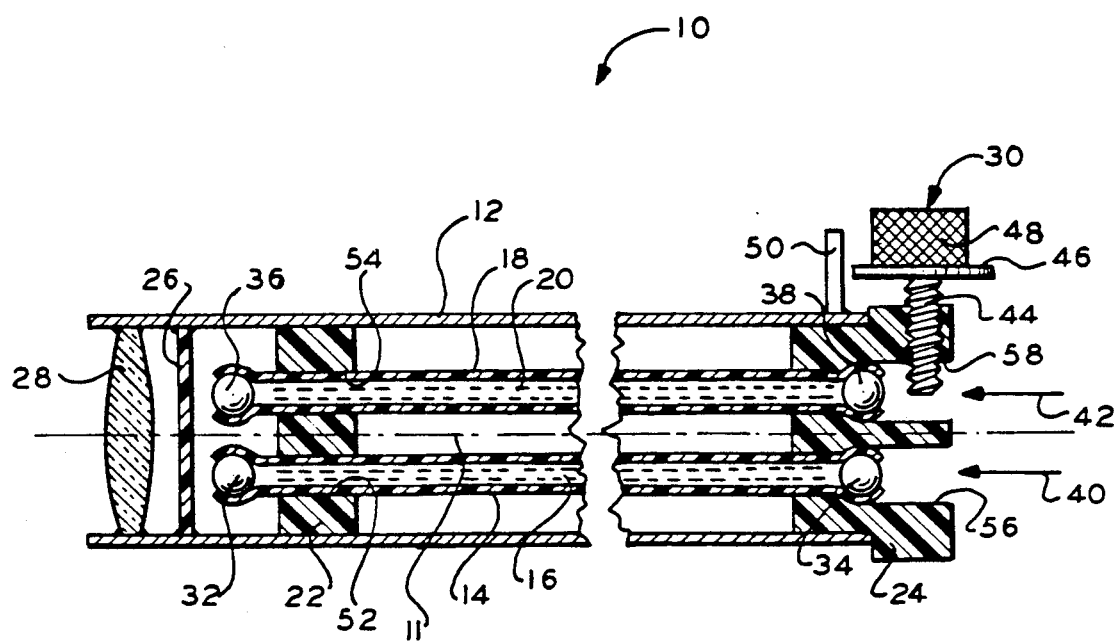
FIG. 1 is a sectional view of a radiochromic dosimeter according to the present invention.

As shown in FIG. 1, a radiochromic dosimeter 10 is provided for use in measuring an absorbed ionizing radiation dose. Dosimeter 10, which is an optical waveguide dosimeter, has a longitudinal axis 11. Dosimeter 10 includes an outer barrel 12, a first inner tube or lower waveguide 14, which is filled with a radiochromic liquid or core mixture 16. Dosimeter 10 also includes a second inner tube or upper waveguide 18, which is filled with a non-radiochromic liquid or core mixture 20. Dosimeter 10 also includes a left wall or support or plug 22, and includes a right wall or support or plug 24. Dosimeter 10 also includes a coaxial light filter 26, which is a yellow light filter and a coaxial lens 28, for comparing the intensities of the lights or light beams passed axially through the respective liquids. Dosimeter 10 also includes a light control and measurement unit 30 for controlling the amount of light inputted axially to second inner tube 18 and for measuring the absorbed ionizing radiation dose. Barrel 12, plugs 22, 24, filter 26 and lens 28 are each circular in cross-section.

First tube or lower tube 14 has left and right end walls or closures or beads 32, 34 for sealing in liquid 16 and for allowing light to pass therethrough. Second tube or upper tube 18 also has left and right end walls or closures or beads 36, 38 for sealing in liquid 20 and for allowing light to pass therethrough. A lower ambient light input 40 is transmitted through first tube 14 at its input end; and an upper ambient light input 42 is transmitted through second tube 18 at its input end.

Light control 30 includes a screw 44, the position of which controls the amount of light from light input 42 that enters second tube 18. Screw 44 at its bottom end is adjustable to vary the projected cross-sectional area of the light entering second tube 18. Screw 46 has a disc or dial 46 and a knurled head 48. Dial 46 has indicia on the top surface thereof. Light control 30 also has a readout post 50 which has indicia on the surface thereof. The number of turns of screw 46 is shown on the post 50. The angle of rotation or percent of a turn is shown on dial 46. Corresponding dose indicia is shown alongside the turn indicia on post 50 and dial 46.

Left plug 22 has lower and upper holes 52, 54, and right plug 24 has lower and upper holes 56, 58. First tube 14 is press fitted into holes 52, 56. Second tube 18 is press fitted into holes 54, 58. Tubes 14, 18 at their left ends at lens 28 are positioned off focus relative to lens axis 11, so that the light beams from tubes 14, 18 are equidistant from lens axis 11.

The materials as used are indicated hereafter. Barrel 12 is made of aluminum metal. An alternate material for barrel 12 is opaque plastic material. Tubes 14, 18 are made of an opaque plastic material. An alternate material for tubes 14, 18 is a transparent plastic which has an opaque outer coating for resisting ultraviolet light. Radiochromic liquid or core mixture 16 is 5-20 percent solution of hexahydroxyethyl pararosaniline cyanide, in a solvent of either dimethyl sulfoxide, triethyl phosphate or N,N-dimethyl formamide. The refractive index of the solution or dye solution is greater than the refractive index of the material of tubes 14, 18. Radiochromic liquid 16 is a leuko dye solution. Non-radiochromic liquid 20 is one of the abovedescribed solvents in pure form or mixture of them, without any radiochromic dye, so that it is invulnerable to radiation. Filter 26 is made of plastic material which admits yellow light of the desired frequency band. Lens 28 is made of a glass material of conventional design. Beads 32, 34, 36, 38 are made of a glass material and are coated with a conventional material that absorbs ultraviolet light. Plugs 22, 24 are made of an opaque plastic material. The opaque plastic material resists ultraviolet light.

In use or operation, ionizing radiation reduces the transmittance of the lower or radiochromic waveguide 14; but the radiation does not affect the upper or non-radiochromic waveguide 18. Light filter 26 passes only the frequency band of visible light at which the radiation induced change is most pronounced.

As the ends of both waveguides 14, 18 at lens 28 are positioned off focus, they appear as two blurred yellow circles which seem to intersect with each other.

The reading of the dose delivered to dosimeter 10 is accomplished by turning readout screw 44 to change the amount of the ambient light input 42 which enters non-radiochromic waveguide 18 until both yellow circles appear to be equally bright. The number of turns of screw 44 and its angle of rotation are indicated by the indicia on readout post 50 and indicia on dial 46.

One prototype of dosimeter 10, which has waveguides 14, 18 each of which is about 12.5 centimeters, or about 5 inches in length, has an operational range of about 0 to 800 rads (tissue). Such prototype responds to gamma rays and fast neutrons. The reading of such prototype is independent of the dose rate at which the radiation is delivered.

A method of manufacture of a radiochromic dosimeter 10 is provided as indicated hereafter. Form an ultraviolet resistant, radiation absorbing, first hollow member 14 filled with a radiochromic liquid 16 for axially passing therethrough a first light beam from an input end to an output end thereof, form an ultraviolet resistant, radiation absorbing, elongate second parallel hollow member 18 filled with a non-radiochromic liquid 20 for axially passing therethrough a second light beam from an input end to an output end thereof parallel to the first beam. Form a light beam filter 26 to admit yellow light from the output ends. Form a lens 28 for comparing filtered yellow circles of the light beams disposed on the lens. Form a light adjuster 30 for adjusting the section of the beam entering the second hollow member so that the yellow circles of the beam sections on the lens can be adjusted to equal brightness. Calibrate the light adjuster and add indicia for reading ionization radiation dose absorbed.

The advantages of dosimeter 10 are indicated hereafter.

A) Dosimeter 10 is a novel tactical dosimeter.

B) Dosimeter 10 is a tactical dosimeter, which has a substantially better accuracy of dose measurement than the prior art tactical dosimeter.

C) Dosimeter 10, is useful for civilian defense applications and for medical applications and for like applications.

D) Dosimeter 10 does not require a power source or other auxiliary devices.

E) Dosimeter 10 is useful as a pocket size, pencil shaped dosimeter.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A radiochromic dosimeter comprising: an outer barrel having an axis;

a first elongate inner tube opaque to ultraviolet light and transparent to ionizing radiation;
said first inner tube being filled with a liquid solution of leuko dye which has an index of refraction greater than the refractive index of said first inner tube and which changes color upon exposure to ionizing radiation;

a second elongate inner tube opaque to ultraviolet light and transparent to ionizing radiation;
said second inner tube being filled with a liquid solvent which does not change color upon exposure to ionizing radiation;

said first and second inner tubes each having input and output closure portions for passage of first and second lights therethrough and for liquid sealing;

said outer barrel having input and output end support members for supporting the first and second inner tubes;

said first and second inner tubes having output light intensity comparison means for comparing the intensities of the lights passed axially through the respective liquids; and said second inner tube having input light control and measurement means for adjusting the amount of light inputted axially through the liquid therein and for measuring the absorbed ionizing radiation dose when the compared lights have about equal intensity.

2. The dosimeter of claim 1, wherein the light intensity comparison means includes:

a light filter disposed coaxially with the barrel along the barrel axis; and a lens disposed coaxially with the barrel along the barrel axis and axially outwardly from said filter.

3. The dosimeter of claim 1, wherein the light control and measurement means includes:

a readout post mounted on and extending radially outwardly from the barrel at the tube input end and having indicia for recording the absorbed ionizing radiation dose;

a readout screw threaded into the input end tube support member at the tube input end and having a lower end portion for adjusting the amount of light inputted axially through the liquid in the second inner tube and having an upper end portion with a disc;

said post having indicia for recording a total number of screw turns and for displaying the absorbed radiation dose; and said disc having indicia for recording a percent of one screw turn and for displaying its corresponding dose amount.

4. The dosimeter of claim 1, wherein the structures of the first and second inner tubes are identical.

5. The dosimeter of claim 1, wherein the barrel is made of aluminum metal; and the tubes and tube support members are made of an opaque plastic material; and the tube closure portions are glass beads having exterior exposed surfaces coated with an ultraviolet light absorbing coating.

6. A method of manufacture of a radiochromic dosimeter including the steps of:

forming an ultraviolet light resistant, ionizing radiation transparent, sealed, first hollow member filled with a leuko dye liquid solution for axially passing therethrough a first light beam from an input end to an output end thereof;

forming an ultraviolet light resistant, ionizing radiation transparent, sealed, second parallel hollow member filled with a liquid solvent for axially passing therethrough a second light beam from an input end to an output end thereof;

forming at the output ends a light beam filter to admit yellow light;

forming at the filter a lens for comparing filtered yellow light circles of the light beams disposed on the lens;

forming a light adjuster for adjusting the section of the light beam entering the second hollow member so that the yellow circles of the light beams can be adjusted to equal brightness; and calibrating the light adjuster and adding indicia thereon for reading an ionized radiation dose.

7. A dosimeter comprising:

an outer barrel with an axis;

a first ionizing radiation transparent tube;

a liquid solution of leuko dye disposed in the first tube;

a second ionizing radiation transparent tube;

a liquid solvent disposed in the second tube;

the tubes each having end sealing beads;

the outer barrel having axially spaced tube supports;

a filter disposed axially next to output ends of the tubes;

a lens disposed axially outwardly of the filter; and a light adjuster for controlling an amount of light entering an input end of the second tube.

* * * * *